US010089058B2

(12) United States Patent
Zhao (10) Patent No.: US 10,089,058 B2
(45) Date of Patent: Oct. 2, 2018

(54) VIEW DISPLAY PROCESSING METHOD, APPARATUS, AND PROJECTION DEVICE (71) Applicant: ZTE CORPORATION, Shenzhen (CN)

(72) Inventor: Dongxiao Zhao, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/319,109

(22) PCT Filed: Aug. 20, 2014

(86) PCT No.: PCT/CN2014/084842
§ 371 (c)(1),
(2) Date: Mar. 24, 2017

(87) PCT Pub. No.: WO2015/192462
PCT Pub. Date: Dec. 23, 2015

(65) Prior Publication Data
US 2017/0192738 A1  Jul. 6, 2017

(30) Foreign Application Priority Data
Jun. 16, 2014 (CN) .......................... 2014 1 0268496

(51) Int. Cl.
G06F 3/048 (2013.01)
G06F 3/14 (2006.01)
(Continued)

(52) U.S. Cl.
CPC ........ *G06F 3/1462* (2013.01); *G06F 3/04845* (2013.01); *G06F 3/04883* (2013.01)

(58) Field of Classification Search
CPC . G06F 3/1462; G06F 3/04845; G06F 3/04883
(Continued)

(56) References Cited

U.S. PATENT DOCUMENTS 6,331,840 B1 * 12/2001 Nielson ................ G06F 3/0488
345/1.1
6,940,558 B2    9/2005 Lu et al.
(Continued)

FOREIGN PATENT DOCUMENTS

CN    1600023     3/2005
CN    101026733   8/2007
CN    101959463   1/2011

OTHER PUBLICATIONS

International Search Report for PCT/CN2014/084842, English Translation attached to original, Both completed by the Chinese Patent Office on Feb. 2, 2015, All together 5 Pages.
(Continued)

Primary Examiner — David Phantana Angkool
(74) Attorney, Agent, or Firm — Plumsea Law Group, LLC (57) ABSTRACT A view display processing method and device and projection equipment are described. The method includes that: a target display area on a first display interface for displaying on a second display interface is determined; and a target display view corresponding to the target display area is determined, wherein the target display view is different from a view displayed on the first display interface; and the target display view is displayed on the second display interface. The method, device and apparatus solve the problem that a terminal with multiple sets of display systems cannot perform a differentiated display according to different display requirements in the related technology, and effects are further achieved that the terminal with the multiple sets of display systems can perform the differentiated display according to different display requirements and user experiences are improved.

7 Claims, 6 Drawing Sheets (51) Int. Cl.
*G06F 3/0488* (2013.01)
*G06F 3/0484* (2013.01)

(58) Field of Classification Search
USPC .......................................................... 715/798
See application file for complete search history.

(56) References Cited

U.S. PATENT DOCUMENTS

| | | | |
|---|---|---|---|
| 7,859,483 B2 | 12/2010 | Ueno et al. | |
| 8,558,800 B2* | 10/2013 | Kang | G06F 3/0236 |
| | | | 345/168 |
| 8,648,825 B2* | 2/2014 | Sirpal | G06F 1/1616 |
| | | | 345/1.1 |
| 8,659,507 B2 | 2/2014 | Roncalez et al. | |
| 8,810,533 B2* | 8/2014 | Chen | G06F 3/0488 |
| | | | 345/173 |
| 9,098,183 B2* | 8/2015 | Vonshak | G06F 3/048 |
| 9,436,217 B2* | 9/2016 | Sirpal | G06F 1/1616 |
| 9,529,518 B2* | 12/2016 | Kohashi | G06F 3/0488 |
| 9,946,383 B2* | 4/2018 | Cady | G06F 3/0412 |
| 9,965,165 B2* | 5/2018 | Hinckley | G06F 3/0488 |
| 2004/0218036 A1 | 11/2004 | Boss et al. | |
| 2006/0253797 A1 | 11/2006 | Madan et al. | |
| 2007/0192749 A1* | 8/2007 | Baudisch | G06F 3/0486 |
| | | | 715/863 |
| 2009/0027302 A1 | 1/2009 | Li | |
| 2016/0291843 A1* | 10/2016 | Sheng | G06F 3/0481 |

OTHER PUBLICATIONS

Extend European Search Report for EP 14894830.0, completed by the European Patent Office on May 05, 2017 All together 8 Pages.

* cited by examiner

$$R0:(P0,A0,B0,S0)\begin{cases} R1:(P1,A1,B1,S1) \\ R2:(P2,A2,B2,S2) \\ \quad \cdot \\ \quad \cdot \\ \quad \cdot \\ Rn:(Pn,An,Bn,Sn) \end{cases} \begin{array}{l} \text{Charateristic} \\ \text{value comparison} \\ \rightarrow \end{array}$$

|    | P   | A   | B   | S   |                | M   |
|----|-----|-----|-----|-----|----------------|-----|
| R0 | Vp0 | Va0 | Vb0 | Vs0 | Weight         | 0   |
| R1 | Vp1 | Va1 | Vb1 | Vs1 | addition and ranking | 1   |
| R2 | Vp2 | Va2 | Vb2 | Vs2 | $\rightarrow$  | 2   |
| ·  | ·   | ·   | ·   | ·   |                | ·   |
| Rn | Vpn | Van | Vbn | Vsn |                | n-1 |

M(0)
$\rightarrow$ Acquisition of rectangle Ri

FIG. 12

VIEW DISPLAY PROCESSING METHOD, APPARATUS, AND PROJECTION DEVICE

CROSS-REFERENCE TO RELATED APPLICATION

This application is the U.S. national phase of PCT Application No. PCT/CN2014/084842 filed Aug. 20, 2014, which claims priority to Chinese Application No. 201410268496.0 filed Jun. 16, 2014, the disclosures of which are incorporated in their entirety by reference herein.

TECHNICAL FIELD

The present disclosure relates to the field of communication, and more particularly to a view display processing method and device and projection equipment.

BACKGROUND

In a related technology, portable projection equipment based on an Android intelligent system, which has a Long Term Evolution LTE wireless routing function, usually has two sets of display systems. Herein, one set of a display system is a Liquid Crystal Display LCD system with a touch function, and the other set is a projection display system based on Digital Light Processing DLP. Contents displayed by the two sets of systems during view displaying are completely same. The product is mainly oriented to the commercial field and applied to scenarios of a video conference, a Power Point PPT presentation and the like.

For such portable intelligent projection equipment with multiple sets of display systems, the two sets of output display systems are different on the division of work. The LCD display system with the touch function is more often oriented to an operator, while the projection display system is oriented to audience. But the two sets of output display systems are synchronized during work, that is, only a screen copying display function is realized. However, during practical playing, the operator may be required to execute more operations on an LCD screen with the touch function without influence on playing of the projection display system. Or the operator is only intended to play and display a part of contents of the LCD screen on the projection display system.

Therefore, there is the problem that a terminal with multiple sets of display systems cannot perform differentiated displays according to different display requirements in the related technology.

SUMMARY

The present disclosure provides a view display processing method and device and projection equipment, to at least solve the problem that a terminal with multiple sets of display systems cannot perform a differentiated display according to different display requirements in the related technology.

According to an aspect of the present disclosure, a view display processing method is provided, which includes that: a target display area on a first display interface, which is used for displaying on a second display interface is determined; a target display view corresponding to the target display area is determined, herein the target display view is different from a view displayed on the first display interface; and the target display view is displayed on the second display interface.

Alternatively, the target display area on a first display interface, which is used for displaying on the second display interface is determined according to at least one of manners as follows: the target display area is determined according to curves acquired on the first display interface; and the target display area is determined according to a dragging operation acquired on the first display interface over a preset display box.

Alternatively, the operation that the target display area is determined according to curves acquired on the first display interface includes that: four curves input on the first display interface are received; intersections between the four curves forming an enclosed rectangle are determined; and midpoints between every two adjacent intersections are determined to form straight lines for forming a rectangle corresponding to the target display area.

Alternatively, the operation that the target display area is determined according to a dragging operation acquired on the first display interface over a preset display box includes that: the preset display box is displayed; and processing for changing position and size of the preset display box is received; and an area corresponding to the changed preset display box is determined as the target display area.

Alternatively, the step that a target display view corresponding to the target display area is determined includes that: an area characteristic value of the target display area is acquired; and view characteristic values of all sub-views included in the view displayed on the first display interface are traversed, and a sub-view corresponding to a view characteristic value, whose correlation with the area characteristic value is maximum, is determined as the target display view.

Alternatively, the step that view characteristic values of all the sub-views included in the view displayed on the first display interface are traversed and a sub-view corresponding to a view characteristic value, whose correlation with the area characteristic value is maximum, is determined as the target display view includes that: weights for identifying magnitudes of differences with the area characteristic value are assigned to various parameters included in the view characteristic values of the sub-views; and the weights corresponding to various parameters are added; and a sub-view with a minimum weight sum is determined as the target display view.

According to another aspect of the present disclosure, a view display processing device is provided, which includes: a first determination module, arranged to determine a target display area on a first display interface for displaying on a second display interface; a second determination module, arranged to determine a target display view corresponding to the target display area, herein the target display view is different from a view displayed on the first display interface; and a display module, arranged to display the target display view on the second display interface.

Alternatively, the first determination module includes: a first receiving unit, arranged to receive four curves input on the first display interface; a first determination unit, arranged to determine intersections between the four curves forming an enclosed rectangle; and a second determination unit, arranged to determine midpoints between every two adjacent intersections to form straight lines for forming a rectangle corresponding to the target display area.

Alternatively, the first determination module includes: a display unit, arranged to display a preset display box; a second receiving unit, arranged to receive processing for changing position and size of the preset display box; and a third determination unit, arranged to determine an area corresponding to the changed preset display box as the target display area.

Alternatively, the second determination module includes: an acquisition unit, arranged to acquire an area characteristic value of the target display area; and a fourth determination unit, arranged to traverse view characteristic values of all sub-views included in the view displayed on the first display interface, and determine a sub-view corresponding to a view characteristic value, whose correlation with the area characteristic value is maximum, as the target display view.

Alternatively, the fourth determination unit includes: a value assignment subunit, arranged to assign weights for identifying magnitudes of differences with the area characteristic value to various parameters included in the view characteristic values of the sub-views; an addition subunit, arranged to add the weights corresponding to various parameters; and a determination subunit, arranged to determine a sub-view with a minimum weight sum as the target display view.

According to another aspect of the present disclosure, a projection equipment is provided, which includes any abovementioned device.

According to the present disclosure, the target display area the first display interface, which is used for displaying on the second display interface, is determined; and the target display view corresponding to the target display area is determined, herein the target display view is different from the view displayed on the first display interface; and the target display view is displayed on the second display interface. Therefore, the present disclosure solves the problem that a terminal with multiple sets of display systems cannot perform a differentiated display according to different display requirements in the related technology, and further achieves the effects that the terminal with the multiple sets of display systems can perform the differentiated display according to different display requirements, and user experiences are improved.

BRIEF DESCRIPTION OF DRAWINGS

The drawings described here are used to provide a further understanding to the present disclosure, and form a part of the present application. Schematic embodiments of the present disclosure and descriptions thereof are used to explain the present disclosure and not intended to form improper limitations to the present disclosure. In the drawings.

SPECIFIC EMBODIMENTS

The present disclosure will be described below with reference to the drawings and in combination with embodiments in detail. It needs to be noted that the embodiments in the present application and characteristics in the embodiments may combined mutually under the condition of no conflicts.

Figure 1:
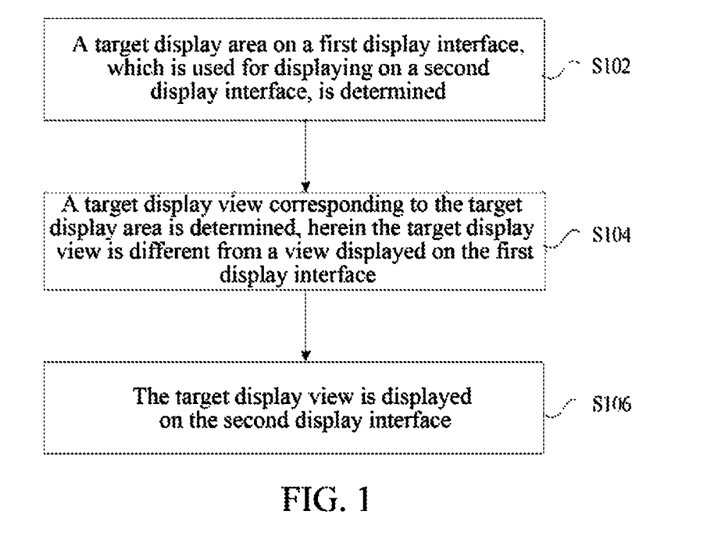
FIG. 1 is a flowchart of a view display processing method according to an embodiment of the present disclosure.

The embodiment provides a view display processing method. FIG. 1 is a flowchart of a view display processing method according to an embodiment of the present disclosure, and as shown in FIG. 1, the flow includes the following steps:

In step S102, a target display area on a first display interface, which is used for displaying on a second display interface, is determined.

In step S104, a target display view corresponding to the target display area is determined, herein the target display view is different from a view displayed on the first display interface.

In step S106, the target display view is displayed on the second display interface.

By the above steps, the target display area for displaying on the second display interface in the first display interface is determined, and the target display view is displayed according to the target display area. Herein, the target display view is different from the view displayed on the first display interface. Compared with the related technology where equipment with multiple sets of display systems can realize a screen copying display function only, the present disclosure not only solves the problem that a terminal with multiple sets of display systems cannot perform differentiated displays according to different display requirements in the related technology, but also achieves effects that the terminal with the multiple sets of display systems can perform differentiated displays according to different display requirements and user experiences are improved.

The operation that on the first display interface, the target display area for displaying on the second display interface is determined may adopt multiple manners, for example, may be implemented in at least one of manners as follows: the target display area is determined according to curves acquired on the first display interface; and the target display area is determined according to a dragging operation, acquired on the first display interface over a preset display box. Descriptions about the two manners will be made below with examples respectively.

For example, the operation that the target display area is determined according to the curves acquired on the first display interface includes that: four curves (the curves may be approximate curves, input by a user, of other display areas) input on the first display interface are received; intersections between the four curves forming an enclosed rectangle are determined; and midpoints between every two adjacent intersections are determined to form straight lines for forming a rectangle corresponding to the target display area.

For another example, when the target display area is determined according to the dragging operation acquired on the first display interface over the preset display box, the following processing manner may be adopted. The preset display box is displayed; and processing for changing position and size of the preset display box is received; and an area corresponding to the changed preset display box is determined as the target display area.

Alternatively, when the target display view corresponding to the target display area is determined, a characteristic value manner may be adopted: an area characteristic value of the target display area is acquired at first; and view characteristic values of all sub-views included in the view displayed on the first display interface are traversed, and a sub-view corresponding to a view characteristic value, whose correlation with the area characteristic value is maximum, is determined as the target display view.

Herein, when the view characteristic values of all the sub-views included in the view displayed on the first display interface are traversed and a sub-view corresponding to a view characteristic value, whose correlation with the area characteristic value is maximum, is determined as the target display view, the following manner may alternatively be adopted: weights for identifying magnitudes of differences with the area characteristic value are assigned to various parameters included in the view characteristic values of the sub-views at first; and the weights corresponding to various parameters are added; and the sub-view with a minimum weight sum is determined to be the target display view.

The embodiment further provides a view display processing device, which is used to implement the abovementioned embodiments and alternative implementation modes, and what has been described will not be elaborated. For example, term "module", used below, may implement a combination of software and/or hardware with a preset function. Although the device described in the following embodiments is preferably implemented with software, implementation with hardware or a combination of software and hardware is also possible and conceivable.

Figure 2:
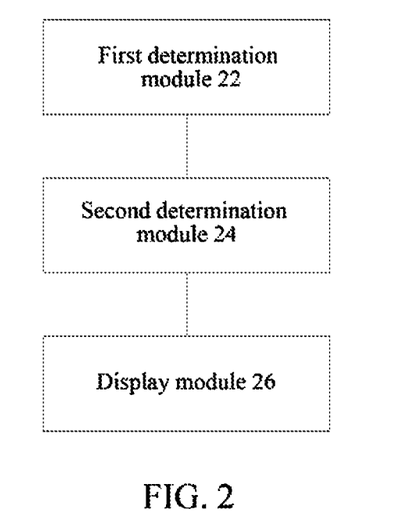
FIG. 2 is a structure block diagram of a view display processing device according to an embodiment of the present disclosure.

FIG. 2 is a structure block diagram of a view display processing device according to an embodiment of the present disclosure, and as shown in FIG. 2, the device includes a first determination module 22, a second determination module 24 and a display module 26. The device will be described below.

The first determination module 22 is arranged to determine a target display area on a first display interface, which is used for displaying on a second display interface. The second determination module 24, connected to the first determination module 22, is arranged to determine a target display view corresponding to the target display area. Herein, the target display view is different from a view displayed on the first display interface. The display module 26, connected to the second determination module 24, is arranged to display the target display view on the second display interface.

Figure 3:
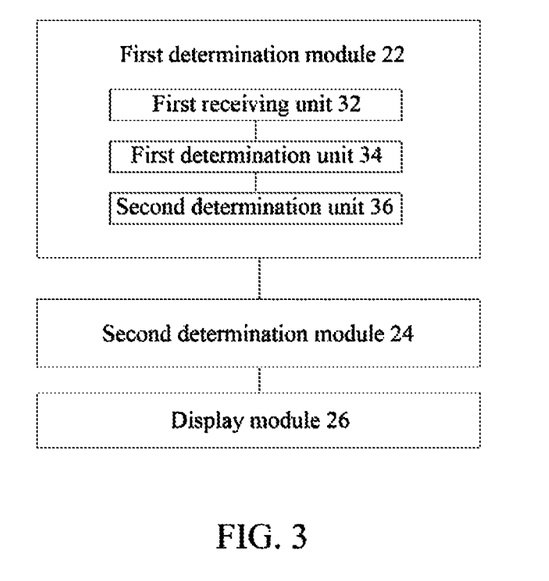
FIG. 3 is a first alternative structure block diagram of a first determination module 22 in the view display processing device according to an embodiment of the present disclosure.

FIG. 3 is a first alternative structure block diagram of the first determination module 22 in the view display processing device according to an embodiment of the present disclosure. As shown in FIG. 3, the first determination module 22 includes: a first receiving unit 32, a first determination unit 34 and a second determination unit 36. The first determination module 22 will be described below.

The first receiving unit 32 is arranged to receive four curves input on the first display interface. The first determination unit 34, connected to the first receiving unit 32, is arranged to determine intersections between the four curves forming an enclosed rectangle. The second determination unit 36, connected to the first determination unit 34, is arranged to determine midpoints between every two adjacent intersections to form straight lines for forming a rectangle corresponding to the target display area.

Figure 4:
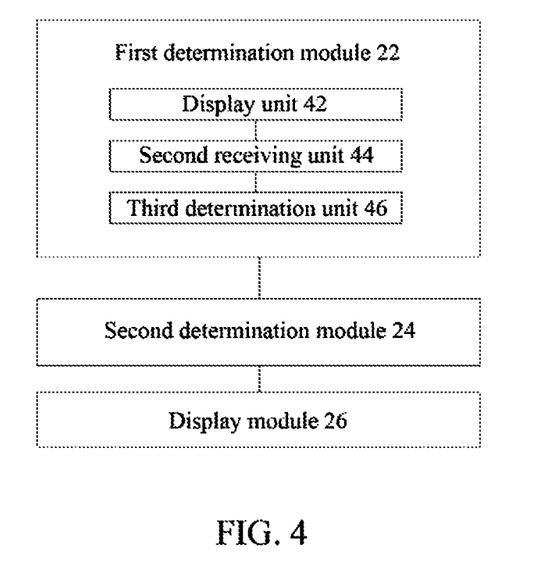
FIG. 4 is a second alternative structure block diagram of the first determination module 22 in the view display processing device according to an embodiment of the present disclosure.

FIG. 4 is a second alternative structure block diagram of the first determination module 22 in the view display processing device according to an embodiment of the present disclosure. As shown in FIG. 4, the first determination module 22 includes: a display unit 42, a second receiving unit 44 and a third determination unit 46. The first determination module 22 will be described below.

The display unit 42 is arranged to display a preset display box. The second receiving unit 44, connected to the display unit 42, is arranged to receive processing for changing position and size of the preset display box. The third determination unit 46, connected to the second receiving unit 44, is arranged to determine an area corresponding to the changed preset display box to be the target display area.

Figure 5:
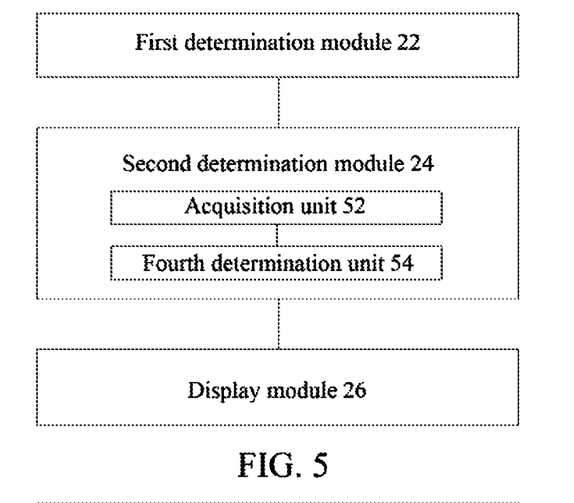
FIG. 5 is an alternative structure block diagram of a second determination module 24 in the view display processing device according to an embodiment of the present disclosure.

FIG. 5 is an alternative structure block diagram of the second determination module 24 in the view display processing device according to an embodiment of the present disclosure. As shown in FIG. 5, the second determination module 24 includes an acquisition unit 52 and a fourth determination unit 54. The second determination module 24 will be described below.

The acquisition unit 52 is arranged to acquire an area characteristic value of the target display area. The fourth determination unit 54, connected to the acquisition unit 52, is arranged to traverse view characteristic values of all sub-views included in the view displayed on the first display interface, and determine a sub-view corresponding to a view characteristic value, whose correlation with the area characteristic value is maximum, as the target display view.

Figure 6:
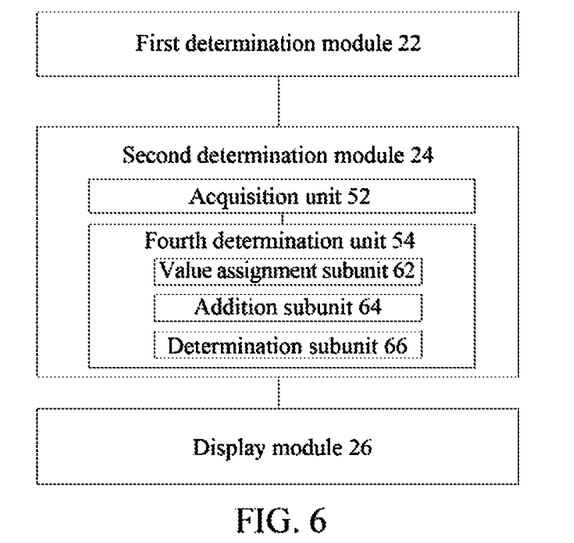
FIG. 6 is an alternative structure block diagram of a fourth determination unit 54 in the second determination module 24 in the view display processing device according to an embodiment of the present disclosure.

FIG. 6 is an alternative structure block diagram of a fourth determination unit 54 in the second determination module 24 in the view display processing device according to an embodiment of the present disclosure. As shown in FIG. 6, the fourth determination unit 54 includes: a value assignment subunit 62, an addition subunit 64 and a determination subunit 66. The fourth determination unit 54 will be described below.

The value assignment subunit 62 is arranged to assign weights, for identifying magnitudes of differences with the area characteristic value, to various parameters included in the view characteristic values of the sub-views. The addition subunit 64, connected to the value assignment subunit 62, is arranged to add the weights corresponding to the various parameters. The determination subunit 66, connected to the addition subunit 64, is arranged to determine a sub-view with a minimum weight sum to be the target display view.

Figure 7:
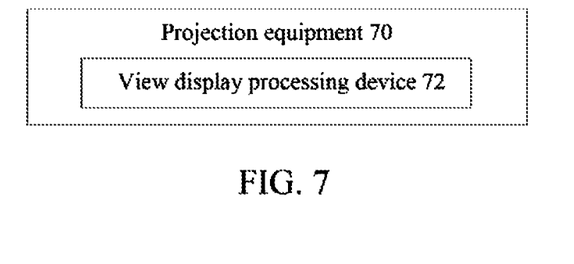
FIG. 7 is a structure block diagram of a projection equipment according to an embodiment of the present disclosure.

FIG. 7 is a structure block diagram of a projection equipment according to an embodiment of the present disclosure. As shown in FIG. 7, the projection equipment 70 includes any abovementioned view display processing device 72.

There is a problem in the related technology. For example, when two sets of output display systems synchronously work, only a screen copying display function can be realized. However, an operator may expect to show a part of display contents to audience only. For example, during financial report analysis, the operator makes an explanation by virtue of a word document, and the operator is only intended to show a financial statement to the audience, but he/she is required to know text contents. For another example, when a video is played on a webpage, the operator is only intended to play the video to the audio, but he/she is required to control playing and pausing, know video information and acquire text information. For a third example, when making an explanation by virtue of PPTs with thumbnails during a business presentation, the operator expects the audience to see only one piece of PPT, but he/she can see more thumbnails for an accurate switching operation. There are many similar scenarios. Different identities cause different requirements on display contents, but an existing portable intelligent projection product with multiple sets of display systems only realizes the screen copying display function, so a differentiated display requirement cannot be met. For the problem, the embodiment provides a differentiated multipath output display technology intelligently identifying a display intention of a user. Differentiated multipath output display equipment has multiple paths of video output, herein one path is an LCD with a touch function, and other one or multiple paths of output are projection equipment or wired external display equipment or other display equipment connected in a wireless manner. The user describes his/her differentiated display intention in a certain manner, and cuts a certain part rectangular display area of an LCD area with the touch function to perform a differentiated display through another path of output.

In the embodiment, the technology starts from reception of a triggering operation for the differentiated display expected by the user by the equipment, and the operation includes, but not limited to, triggering manners, such as physical key starting, software command issuance, voice control command and the like. After receiving the triggering operation, the equipment may judge the differentiated display intention of the user and acquire an approximate rectangle approximate to a target area for the differentiated display expected by the user. The judgment is made in an active or passive manner. Herein, the passive manner includes, but not limited to, the following manner. The user draws a rectangular area on an LCD screen with the touch function, and the system acquires a touch action of the user, and acquires a touch curve and abstracts the touch curve to obtain the approximate rectangle of the target area. The active manner includes, but not limited to, the following manner. The equipment provides a standard rectangular display box with a variable size and position, and the user determines a differentiated target display area by operations of dragging, scaling and the like. The area is the approximate rectangle of the target area. Meanwhile, the equipment may extract existing rectangles in a display content of the LCD, and compare characteristic values, and determine the most approximate rectangular area. The equipment determines the area to be the target display area of the user, and then perform the differentiated display in the multipath output equipment.

Compared with the related technology, in the abovementioned embodiments and alternative embodiments, an identification algorithm is essentially improved, and efficiency is greatly improved, and user experiences may be greatly improved.

The alternative implementation modes of the present disclosure will be described below with reference to the drawings.

A differentiated multipath output display solution may include the following steps.

In S1, triggering of the user is received, that is, the equipment receives a triggering operation of the user. Herein, the operation includes, but not limited to triggering manners, such as physical key starting, software command issuance, voice control command and the like.

In S2, an approximate rectangle of a target area of the user is determined, including active and passive manners.

Figure 8:
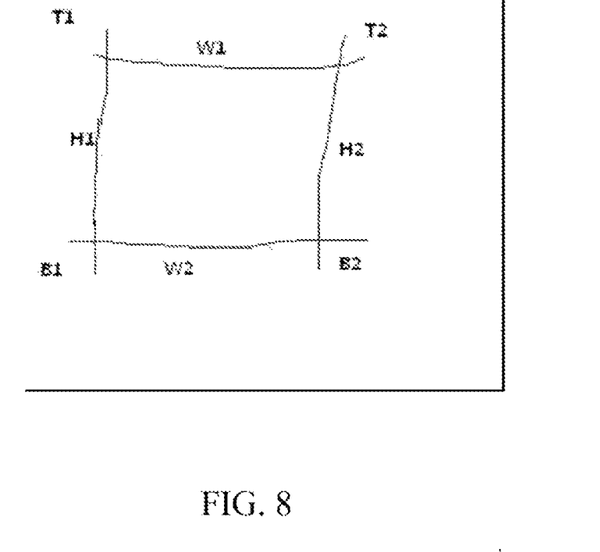
FIG. 8 is a schematic diagram of touch curves virtualized by a user according to an alternative implementation mode of the present disclosure.

The passive manner includes, but not limited to, the following manner. Touch data of the user is acquired. The equipment prompts the user to draw a rectangular area expected to be displayed by the user in a touch manner of drawing straight lines for four times when the user shows a differentiated display intention. A system records touch curves of the user when the user draws the area expected to be displayed by the user with a finger on the LCD screen with the touch function. FIG. 8 is a schematic diagram of virtual touch curves of a user according to an alternative implementation mode of the present disclosure. As shown in FIG. 8, the four curves are H1, H2, H3 and H4 respectively, and positions of points on the four curves are represented by coordinates. Then, the approximate rectangle of the target area of the user is determined by the following steps:

(1) Intersections of the touch curves are determined. Point coordinate comparisons are performed between curve H1 and W1, curve H1 and W2, and between H2 and W1, H2 and W2 respectively, and points with the same coordinate position are determined to be one point, then four intersections are determined. If two certain curves have no intersection, endpoints at two ends of the curves are prolonged towards two sides to expand the curves to finally determine an intersection. Herein, H1 and W1 have an intersection T1, H1 and W2 have an intersection B1. H2 and W1 have an intersection T2, and H1 and W2 have an intersection B2. Referring to FIG. 8, specific information will be seen.

Figure 9:
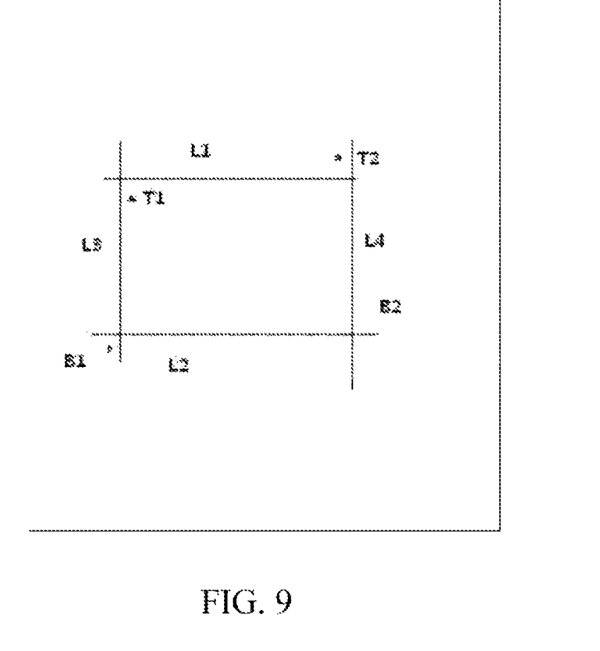
FIG. 9 is a schematic diagram of abstraction of a target area of a user according to an alternative implementation mode of the present disclosure.

(2) The approximate rectangle of the target area is determined. FIG. 9 is a schematic diagram of abstraction of a target area of a user according to an alternative implementation mode of the present disclosure. As shown in FIG. 9, taking a midpoint between T1 and T2 to draw a horizontal straight line L1, a midpoint between B1 and B2 to draw a horizontal straight line L2, a midpoint between T1 and B1 to draw a vertical straight line L3, and a midpoint between T2 and B2 to draw a vertical straight line L4, a rectangle determined by the four straight lines L1, L2, L3 and L4 is the approximate rectangle of the target area of the user, and the rectangle is R0. Characteristic values of the approximate rectangle of the target area are extracted. Herein, a coordinate of the center of gravity of the rectangle is P0, and a horizontal side length of the rectangle is A0, and a vertical side length is B0, and an area is S0.

The active manner includes, but not limited to, the following manner. The equipment provides a rectangular with a variable size and position for the user through the LCD screen which may be touched after receiving the triggering action. The user determines the target display area by manually changing the size and position of the box. The equipment takes the area as the approximate rectangle of the target area of the user, and the rectangle is R0. Characteristic values of the approximate rectangle of the target area are extracted. Herein, a coordinate of the center of gravity of the rectangle is P0, and a horizontal side length of the rectangle is A0, and a vertical side length is B0, and an area is S0.

Figure 10:
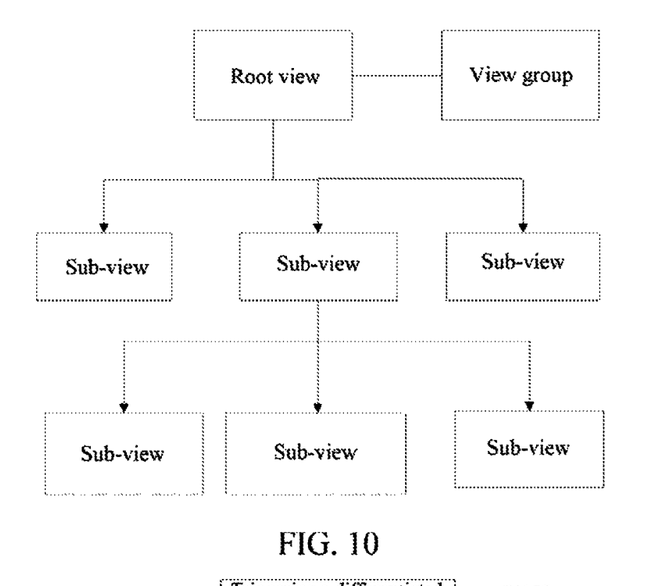
FIG. 10 is a schematic diagram of a user interface view of a view tree formed by root views according to an alternative embodiment of the present disclosure.
Figure 11:
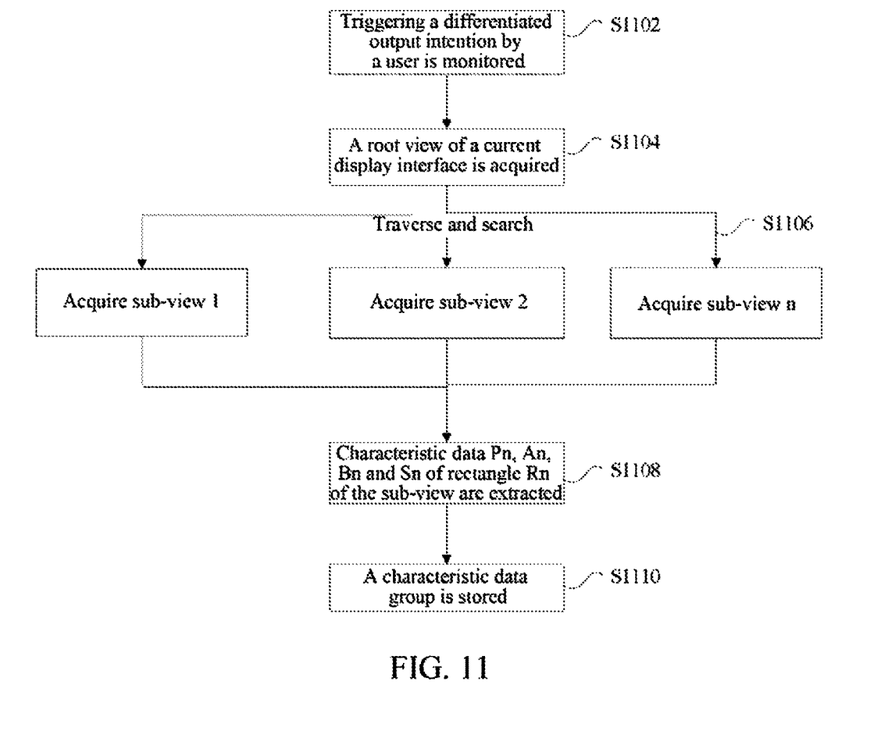
FIG. 11 is a flowchart of performing a judgment on a valid rectangle in a display area according to an alternative implementation mode of the present disclosure.

In S3, a valid rectangle in a display area of the LCD is judged. A user interface window is defined by a rectangular view (view tree) with a treelike structure. Taking an Android system as an example, a user interface view is a view tree formed by a ViewGroup. FIG. 10 is a schematic diagram of a user interface view, which is a view tree formed by root views, according to an alternative embodiment of the present disclosure. As shown in FIG. 10, the system draws each element of the view tree from top to bottom. FIG. 11 is a flowchart of performing a judgment on a valid rectangle in a display area according to an alternative implementation mode of the present disclosure. As shown in FIG. 11, the flow includes the following steps.

In step S1102, Triggering a differentiated output intention by a user is monitored.

In step S1104, when the user makes the differentiated display intention, the equipment may acquire a root view object of a current display interface.

In step S1106, all sub-view objects of the current display interface are traversed and searched for.

In step S1108, Characteristic values, i.e. Pn, An, Bn and Sn respectively, of rectangles Rn of the sub-view are acquired. For example, a position of rectangle R1 of the sub-view in the screen is acquired, and characteristic values are extracted, such as, the coordinate P1 of the center of gravity, the horizontal side length A1 of the rectangle, the vertical side length B1 and the area S1 . . . Characteristic values of rectangle Rn, such as, the coordinate Pn of the center of gravity, the horizontal side length An of the rectangle, the vertical side length Bn and the area Sn, Characteristic value information group of all the sub-views is stored. These rectangles are defined as R1, R2, R3 . . . Rn respectively, the characteristic values of the valid rectangle R1 in the area are P1, A1, B1 and S1 respectively, the characteristic values of the valid rectangle R2 in the area are P2, A2, B2 and S2 respectively, . . . , and the characteristic values of the valid rectangle Rn in the area are Pn, An, Bn and Sn respectively.

In step S1110, the characteristic data group is stored.

Figure 12:
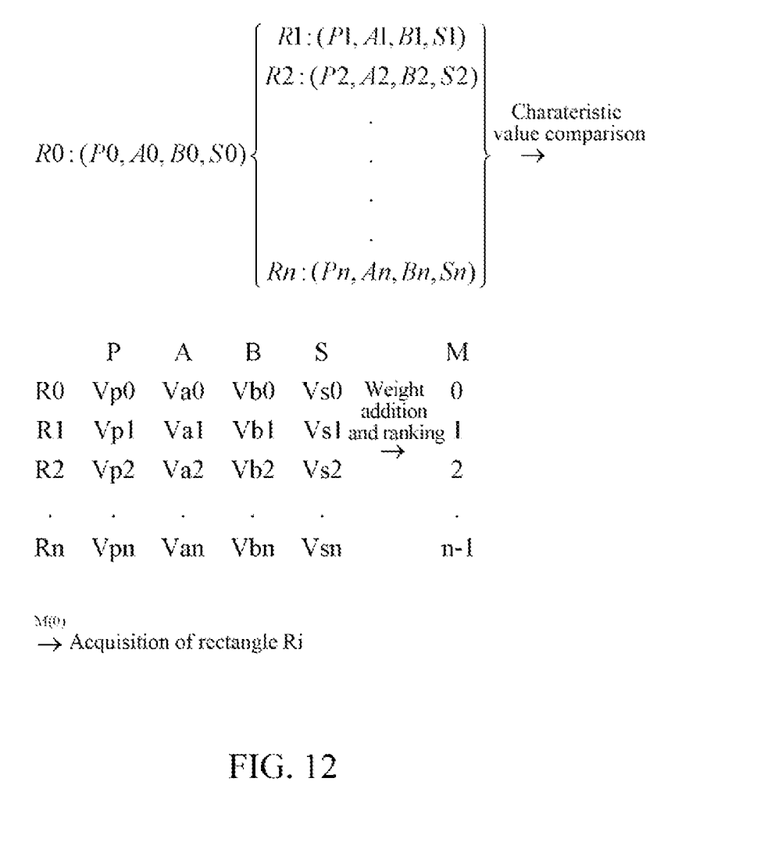
FIG. 12 is a schematic diagram of a manner for judging a target display rectangle according to an alternative implementation mode of the present disclosure.

In S4, the target display rectangle of the user is judged. FIG. 12 is a schematic diagram of a judgment manner for a target display rectangle according to an alternative implementation mode of the present disclosure. As shown in FIG. 12, the characteristic values of Rn are sequentially compared with the four groups of characteristic values, extracted in step S3, of the approximate rectangle R0 of the target area. For the centers of gravity of the rectangles, distances are compared, and according to a sequence from short distances to long distances weights are assigned with 0, 1, 2, 3, 4 . . . n−1 respectively. For the horizontal side lengths and the vertical side lengths, lengths are compared respectively, and absolute values of length differences are ranked from small absolute values to large absolute values, and weights are assigned with 0, 1, 2, 3, 4 . . . n−1 respectively. For the areas, sizes are compared, according to a sequence from small sizes to large sizes, weights are assigned with 0, 1, 2 . . . n−1 respectively. Finally, each weight is added, and the weights are ranked from small weights to large weights, and the rectangle whose weight is most approximate to 0 is determined as the target display area.

In S5, the target display area is displayed in the projection equipment or the wired external display equipment or the other display equipment connected in the wireless manner.

It is apparent that those skilled in the art should understand that each module or each step of the present disclosure may be implemented by a universal computing device, and the modules or steps may be concentrated on a single computing device or distributed on a network formed by a plurality of computing devices. Alternatively, they can be implemented by program codes executable for the computing devices, so that the modules or steps may be stored in a storage device for execution with the computing devices. The shown or described steps may be executed in sequences different from those described here in some circumstances, or they are manufactured to be various integrated circuit modules respectively, or multiple modules or steps therein are manufactured to be a single integrated circuit module for implementation. As a consequence, the present disclosure is not limited to any specific hardware and software combination.

The above descriptions are only the alternative embodiments of the and not intended to limit the present disclosure. For those skilled in the art, the present disclosure may have various modifications and variations. Any modifications, equivalent replacements, improvements and the like within the rule and principle of the present disclosure shall fall within the scope of protection of the present disclosure.

INDUSTRIAL APPLICABILITY

As mentioned above, through the abovementioned embodiments and alternative implementation modes, not only the problem that a terminal with multiple sets of display systems cannot perform a differentiated display according to different display requirements in the related technology is solved, but also effects that the terminal with the multiple sets of display systems can perform the differentiated display according to different display requirements and user experiences are improved are achieved.

What I claim is:

1. A view display processing method, comprising:
determining a target display area on a first display interface for displaying on a second display interface, wherein the first display interface and the second display interface belong to different display systems;
determining a target display view corresponding to the target display area, wherein the target display view is different from a view displayed on the first display interface; and
displaying the target display view on the second display interface,
wherein the target display area on the first display interface for displaying on the second display interface is determined according to following manner:
determining the target display area according to curves acquired on the first display interface;
wherein said determining the target display area according to curves acquired on the first display interface comprises:
receiving four curves input on the first display interface;
determining intersections between the four curves forming an enclosed rectangle; and
determining midpoints between every two adjacent intersections to form straight lines for forming a rectangle corresponding to the target display area.

2. The method according to claim 1, wherein said determining a target display view corresponding to the target display area comprises:
acquiring an area characteristic value of the target display area; and traversing view characteristic values of all sub-views comprised in the view displayed on the first display interface, and determining a sub-view corresponding to a view characteristic value, whose correlation with the area characteristic value is maximum, as the target display view.

3. The method according to claim 2, wherein said traversing view characteristic values of all the sub-views comprised in the view displayed on the first display interface and determining a sub-view corresponding to a view characteristic value, whose correlation with the area characteristic value is maximum, as the target display view comprises:

assigning weights for identifying magnitudes of differences with the area characteristic value to various parameters comprised in the view characteristic values of the sub-views;

adding the weights corresponding to the various parameters; and determining a sub-view with a minimum weight sum as the target display view.

4. A view display processing device, comprising:

a first determination module, arranged to determine a target display area on a first display interface for displaying on a second display interface, wherein the first display interface and the second display interface belong to different display systems;

a second determination module, arranged to determine a target display view corresponding to the target display area, wherein the target display view is different from a view displayed on the first display interface; and a display module, arranged to display the target display view on the second display interface, wherein the first determination module comprises:

a first receiving unit, arranged to receive four curves input on the first display interface;

a first determination unit, arranged to determine intersections between the four curves forming an enclosed rectangle; and a second determination unit, arranged to determine midpoints between every two adjacent intersections to form straight lines for forming a rectangle corresponding to the target display area.

5. A projection equipment, comprising the device according to claim 4.

6. The device according to claim 4, wherein the second determination module comprises:

an acquisition unit, arranged to acquire an area characteristic value of the target display area; and a fourth determination unit, arranged to traverse view characteristic values of all sub-views comprised in the view displayed on the first display interface, and determine a sub-view corresponding to a view characteristic value, whose correlation with the area characteristic value is maximum, as the target display view.

7. The device according to claim 6, wherein the fourth determination unit comprises:

a value assignment subunit, arranged to assign weights for identifying magnitudes of differences with the area characteristic value to various parameters comprised in the view characteristic values of the sub-views;

an addition subunit, arranged to add the weights corresponding to various parameters; and a determination subunit, arranged to determine a sub-view with a minimum weight sum as the target display view.

* * * * *